United States Patent
Okano et al.

(10) Patent No.: US 11,588,827 B2
(45) Date of Patent: Feb. 21, 2023

(54) ATTACK COMMUNICATION DETECTION DEVICE, ATTACK COMMUNICATION DETECTION METHOD, AND PROGRAM

(71) Applicant: NIPPON TELEGRAPH AND TELEPHONE CORPORATION, Chiyoda-ku (JP)

(72) Inventors: Yasushi Okano, Musashino (JP); Takuma Koyama, Musashino (JP)

(73) Assignee: NIPPON TELEGRAPH AND TELEPHONE CORPORATION, Chiyoda-ku (JP)

( * ) Notice: Subject to any disclaimer, the term of this patent is extended or adjusted under 35 U.S.C. 154(b) by 397 days.

(21) Appl. No.: 16/755,205

(22) PCT Filed: Oct. 23, 2018

(86) PCT No.: PCT/JP2018/039296
§ 371 (c)(1),
(2) Date: Apr. 10, 2020

(87) PCT Pub. No.: WO2019/087858
PCT Pub. Date: May 9, 2019

(65) Prior Publication Data
US 2020/0259846 A1    Aug. 13, 2020

(30) Foreign Application Priority Data
Oct. 30, 2017   (JP) .............................. JP2017-208801

(51) Int. Cl.
*H04L 9/40* (2022.01)
*G06N 20/00* (2019.01)
(Continued)

(52) U.S. Cl.
CPC ......... *H04L 63/1416* (2013.01); *G06N 20/00* (2019.01); *H04L 12/40* (2013.01);
(Continued)

(58) Field of Classification Search
USPC ........................................................ 726/14
See application file for complete search history.

(56) References Cited

U.S. PATENT DOCUMENTS

| 10,091,077 B1* | 10/2018 | Pukish .................... H04L 67/12 |
| 2013/0227648 A1* | 8/2013 | Ricci .................. H04W 12/088 |
| | | 726/3 |

(Continued)

FOREIGN PATENT DOCUMENTS

JP    2017-111796 A    6/2017

OTHER PUBLICATIONS

Song et al.; Intrusion Detection System Based on the Analysis of Time Intervals of CAN Messages for In-Vehicle Network; IEEE (Year: 2016).*

(Continued)

*Primary Examiner* — Kambiz Zand
*Assistant Examiner* — Mahabub S Ahmed
(74) *Attorney, Agent, or Firm* — Oblon, McClelland, Maier & Neustadt, L.L.P.

(57) ABSTRACT

An attack communication detection device that is robust against a deviation from the design value of a communication interval is provided. The attack communication detection device is an attack communication detection device that detects an attack communication from a communication of each electronic control unit in a communication network and includes: a receiving unit that receives communication data for detection which may or may not include an attack communication; a sum-of-communication-intervals calculation unit that calculates the sum of communication intervals, which is the sum of two adjacent communication intervals, of the communication data for detection; an estimated distribution model storage that stores in advance an estimated distribution model of a communication interval and
(Continued)

the sum of communication intervals of communication data for learning which does not include an attack communication; and a detection unit that detects whether or not the communication data for detection includes an attack communication based on the estimated distribution model and the sum of communication intervals of the communication data for detection.

39 Claims, 11 Drawing Sheets

(51) Int. Cl.
*H04L 12/40* (2006.01)
*H04L 12/413* (2006.01)

(52) U.S. Cl.
CPC ........ *H04L 63/1425* (2013.01); *H04L 12/413* (2013.01); *H04L 2012/40215* (2013.01); *H04L 2012/40273* (2013.01)

(56) References Cited

U.S. PATENT DOCUMENTS

| | | | | |
|---|---|---|---|---|
| 2014/0328352 | A1* | 11/2014 | Mabuchi | H04L 12/4035 370/451 |
| 2015/0172306 | A1* | 6/2015 | Kim | H04L 63/08 726/23 |
| 2015/0319185 | A1* | 11/2015 | Kirti | H04L 63/1416 726/23 |
| 2016/0026788 | A1* | 1/2016 | Martini | G06F 9/45558 726/23 |
| 2016/0188396 | A1* | 6/2016 | Sonalker | G06F 11/079 714/37 |
| 2016/0308891 | A1* | 10/2016 | Cain | H04L 67/12 |
| 2016/0381068 | A1* | 12/2016 | Galula | G07C 5/0816 726/23 |
| 2017/0013005 | A1* | 1/2017 | Galula | H04L 63/1425 |
| 2017/0061123 | A1* | 3/2017 | Parker-Wood | G06F 21/556 |
| 2018/0295147 | A1* | 10/2018 | Haga | G07C 5/0808 |
| 2019/0028500 | A1* | 1/2019 | Lee | H04L 12/40032 |
| 2019/0036946 | A1* | 1/2019 | Ruvio | H04W 12/106 |
| 2019/0349392 | A1* | 11/2019 | Wetterwald | H04L 43/0852 |
| 2019/0385057 | A1* | 12/2019 | Litichever | H04L 63/14 |
| 2020/0396238 | A1* | 12/2020 | Haga | H04W 4/40 |
| 2021/0203682 | A1* | 7/2021 | Bajpai | G06F 21/55 |

OTHER PUBLICATIONS

Lee et al.; OTIDS: A Novel Intrusion Detection System for In-vehicle Network by using Remote Frame; 2017 15th Annual Conference on Privacy, Security and Trust; Date of Conference: Aug. 28-30, 2017 (Year: 2017).*

Waszecki et al.; Automotive Electrical and Electronic Architecture Security via Distributed In-Vehicle Traffic Monitoring; IEEE Transactions on Computer-Aided Design of Integrated Circuits and Systems; Date of Publication: Feb. 9, 2017 (Year: 2017).*

Cho et al.; Fingerprinting Electronic Control Units for Vehicle Intrusion Detection; 25th USENIX Security Symposium Aug. 10-12, 2016 • Austin, TX (Year: 2016).*

International Search Report dated Dec. 11, 2018 in PCT/JP2018/039296 filed Oct. 23, 2018.

Satoshi Otsuka, et al., "Intrusion Detection for In-vehicle Networks without Modifying Legacy ECUs," IPSJ SIG Technical Report, vol. 2013-EMB-28, No. 6, 2013, 5 Pages.

* cited by examiner

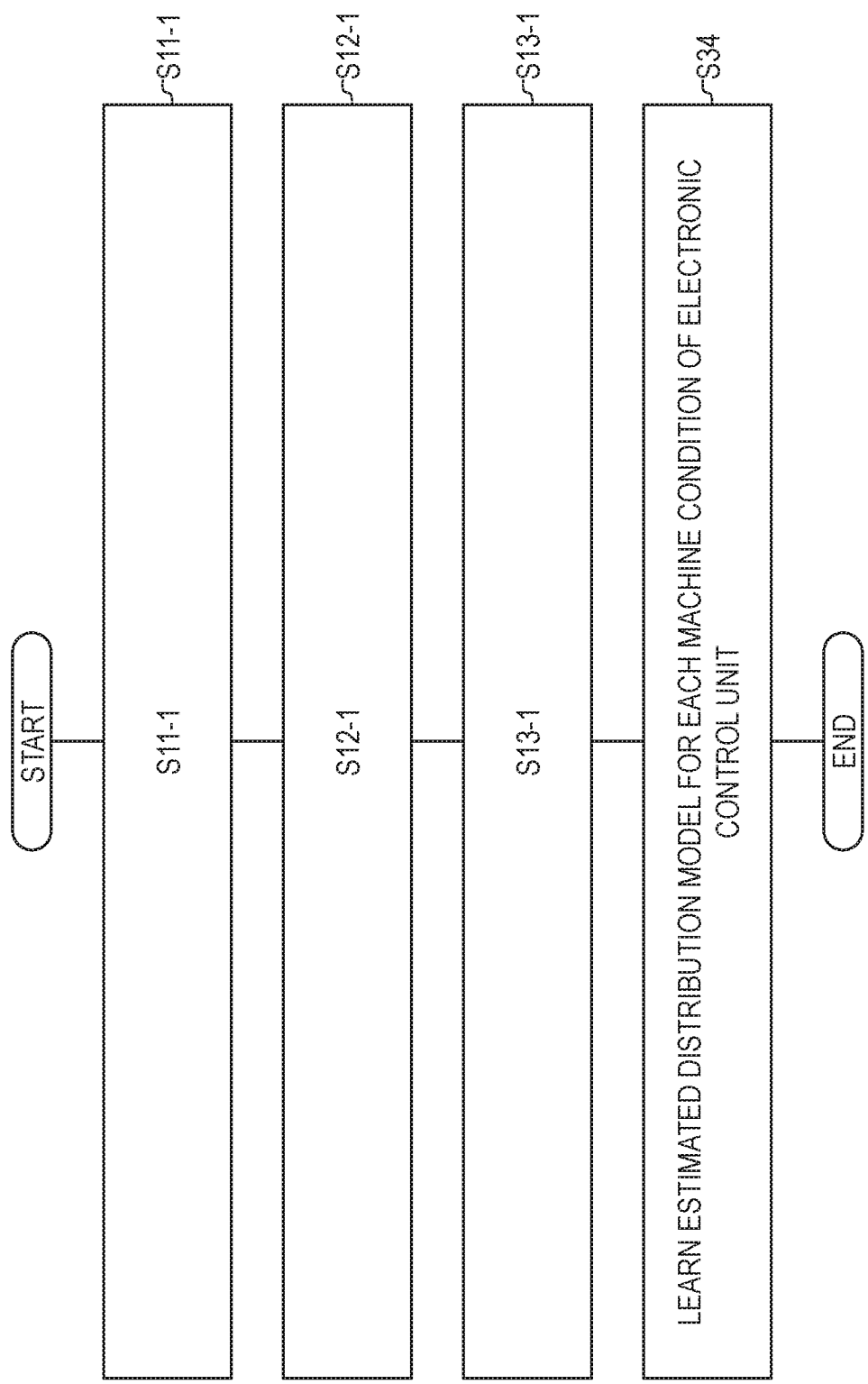

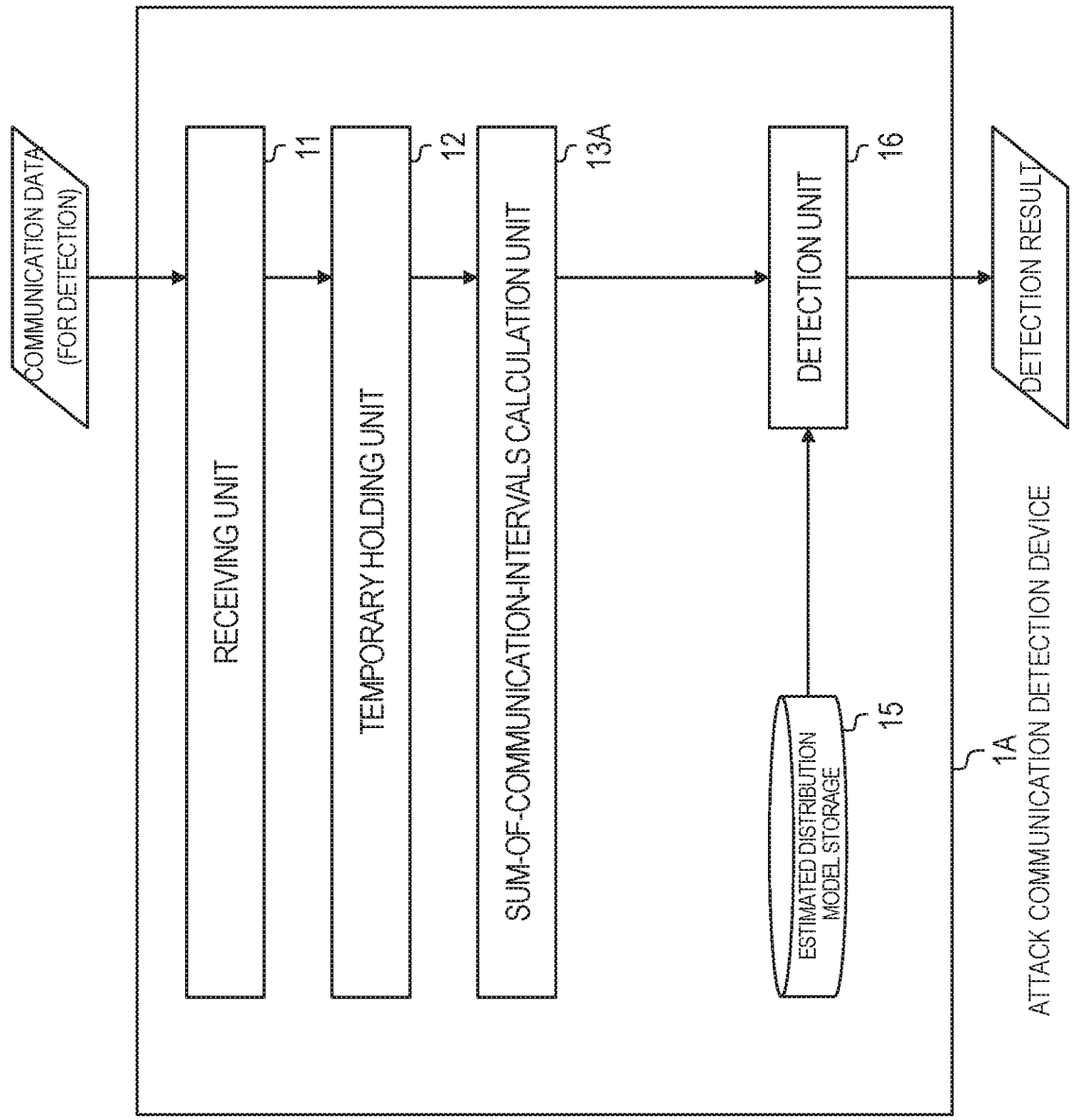

ATTACK COMMUNICATION DETECTION DEVICE, ATTACK COMMUNICATION DETECTION METHOD, AND PROGRAM

TECHNICAL FIELD

The present invention relates to an attack communication detection device, an attack communication detection method, and a program that detect an attack communication in a network incorporated into machinery such as vehicles, machine tools, construction equipment, and agricultural machinery, a communication device connected to the network, and a communication system configured therewith.

BACKGROUND ART

A plurality of electronic control units (ECUs) are incorporated into some machinery such as vehicles (for example, automobiles, special-purpose vehicles, motorcycles, and bicycles), machine tools, construction equipment, and agricultural machinery, and Controller Area Network (CAN) is a representative example that is used in a communication network between these ECUs. The network configuration of CAN is what is called a bus-type configuration in which a communication line of each ECU is shared. As a communication procedure on the bus of the ECUs, carrier sense multiple access/collision resolution (CSMA/CR), that is, a procedure by which, when a communication collision occurs, a communication of higher priority is not affected by the collision and a communication of lower priority is resent is used. A communication of each ECU on CAN includes an ID, and the ID is used for identification of, for example, the priority of communication arbitration, data contents, and a transmission node.

The risk of cyberattacks on these machine control information communication networks is suggested. It is known that attack transmission with an ID related to a function to be attacked is inserted by means such as connecting an unauthorized ECU to the network or unauthorized alteration of operation of the existing ECU, which can cause unauthorized operation of the function to be attacked.

As a method of detecting these attack communications, there is a method of detecting an abnormality in the communication interval between communications with the same ID (for example, Non-patent Literature 1). In CAN, a communication about an important function is designed so as to be sent periodically and the interval between communications with an ID related to the function is almost constant in accordance with the design value. When an attack communication targeted at a certain important function is inserted, the interval between communications with an ID related to the function to be attacked becomes shorter than the design value, which makes attack communication detection possible by detecting the interval abnormality. However, due to, for example, the communication procedure of CSMA/CR, the communication interval often deviates from the design value within a certain tolerance range, which makes it necessary to detect a communication interval abnormality with consideration given to a deviation tolerance.

PRIOR ART LITERATURE

Non-Patent Literature

Non-patent Literature 1: Otsuka and Ishigooka, "Intrusion Detection for In-vehicle Networks without Modifying Legacy ECUs", IPSJ SIG Technical Report, Vol. 2013-EMB-28, No. 6, pp. 31-35, 2013.

SUMMARY OF THE INVENTION

Problems to be Solved by the Invention

In existing detection of an abnormality in a communication interval, it is necessary to grasp the design value of a communication interval and a deviation tolerance in advance. However, in some cases, for example, an ECU is not installed as per the design value of a communication interval or an ECU whose design value itself is unknown (for example, an ECU provided by a third party) is used, which makes it difficult to grasp the design value of a communication interval in advance. As for a deviation tolerance, since there are uncertainties about the communication procedure itself, it is expected that grasping in advance a deviation tolerance of even an ECU installed as per the design value is often difficult. Consequently, when it is impossible to grasp the design value of a communication interval and a deviation tolerance in advance, an interval value has to be grasped for each ID and an adjustment appropriate for a deviation has to be made for each ID, which requires considerable time and effort.

Moreover, the larger the value of a deviation tolerance becomes, the lower the detection accuracy becomes. For instance, when a comparison is made between a deviation tolerance which is ±10% of a design value and a deviation tolerance which is ±50% of the design value, on the assumption that detection is performed in such a way that a normal communication is not erroneously detected as an abnormal communication, while it is possible to detect a communication as an abnormal communication with the former when the interval becomes 90% or less compared to a normal interval value, it is impossible to detect a communication as an abnormal communication with the latter unless the interval becomes 50% or less compared to a normal interval value, which often allows an abnormal communication to escape detection. To achieve a higher degree of detection accuracy, a more appropriate and ingenious way to handle a deviation tolerance is needed.

Thus, an object of the present invention is to provide an attack communication detection device which is robust against a deviation from the design value of a communication interval.

Means to Solve the Problems

An attack communication detection device of the present invention is a device that detects an attack communication from a communication of each electronic control unit in a communication network and includes a receiving unit, a sum-of-communication-intervals calculation unit, an estimated distribution model storage, and a detection unit.

The receiving unit receives communication data for detection which may or may not include an attack communication. The sum-of-communication-intervals calculation unit calculates the sum of communication intervals, which is the sum of two adjacent communication intervals, of the communication data for detection. The estimated distribution model storage stores in advance an estimated distribution model of a communication interval and the sum of communication intervals of communication data for learning which does not include an attack communication. The detection unit detects whether or not the communication data for detection includes an attack communication based on the estimated distribution model and the sum of communication intervals of the communication data for detection.

Effects of the Invention

An attack communication detection device of the present invention is robust against a deviation from the design value of a communication interval.

BRIEF DESCRIPTION OF THE DRAWINGS

FIG. 10 is a flowchart showing a learning operation of the attack communication detection device of the third embodiment.

FIG. 11 is a block diagram showing the configuration of all attack communication detection device of a first modification.

DETAILED DESCRIPTION OF THE EMBODIMENTS

Hereinafter, embodiments of the present invention will be described in detail. It is to be noted that component units having the same function are identified with the same numeral and overlapping explanations are omitted.

The following description is based on the assumption that Controller Area Network (CAN) is used as a protocol of a communication network; however, a protocol of a communication network on which an attack communication detection device of the present invention executes attack communication detection is not necessarily limited to CAN. The attack communication detection device of the present invention may execute attack communication detection on a protocol (for example, Ethernet) of a communication network other than CAN.

The attack communication detection devices of the following embodiments detect an inserted attack communication by appropriately estimating, using not only a communication interval but also the sum of two adjacent communication intervals (hereinafter referred to as the sum of communication intervals), the design values of the communication interval and the sum of communication intervals and a deviation tolerance by performing learning based on the interception of a communication on a machine control information communication network or data obtained by the interception and then detecting an abnormality in the sum of communication intervals (or the communication interval in addition thereto) based on the above estimation.

<Sum of Communication Intervals>

Figure 1:
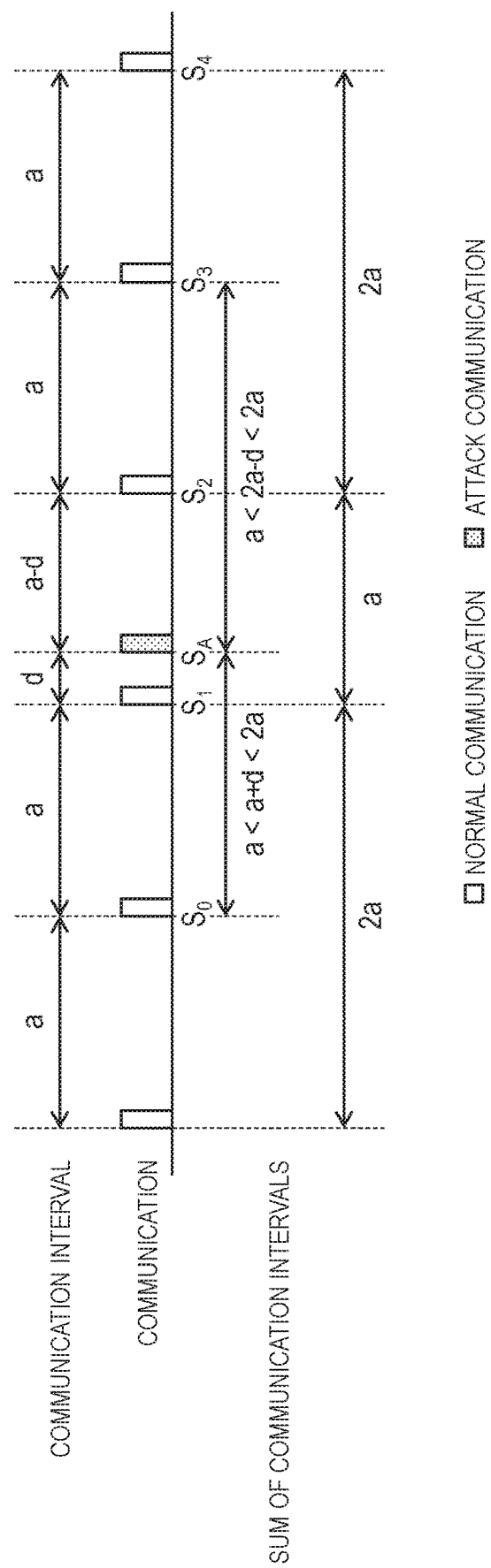
FIG. 1 is a diagram showing an example of a communication interval and the sum of communication intervals when an attack communication is inserted.

First, abnormality detection (attack detection) using the sum of communication intervals will be described. As shown in FIG. 1, in a normal communication, a communication interval is an almost constant interval a (the design value of a communication interval); the interval between a normal communication and an attack communication is a shorter interval d (the interval between a time $S_1$ and a time $S_A$ in FIG. 1). d can arbitrarily vary in a range of $0 \leq d \leq a$ in accordance with timing with which an attack is inserted. On the other hand, when a normal communication continues, the sum of communication intervals is $2a$ (for example, the interval between times $S_2$ and $S_4$ in FIG. 1), which is twice as long as the communication interval; the sum of communication intervals in a normal communication-attack communication-normal communication pattern is always a (the interval between the time $S_1$ and the time $S_2$ in FIG. 1) irrespective of attack insertion timing. When an attack communication is frequently inserted, for example, in the case of a normal communication-an attack communication-an attack communication, the sum of communication intervals is a value less than a. On the other hand, the sum of communication intervals in a normal communication-normal communication-attack communication portion is a+d (the interval between times $S_0$ and $S_A$ in FIG. 1), and the sum of communication intervals in an attack communication-normal communication-normal communication portion is $2a-d$ (the interval between times $S_A$ and $S_3$ in FIG. 1).

Figure 2:
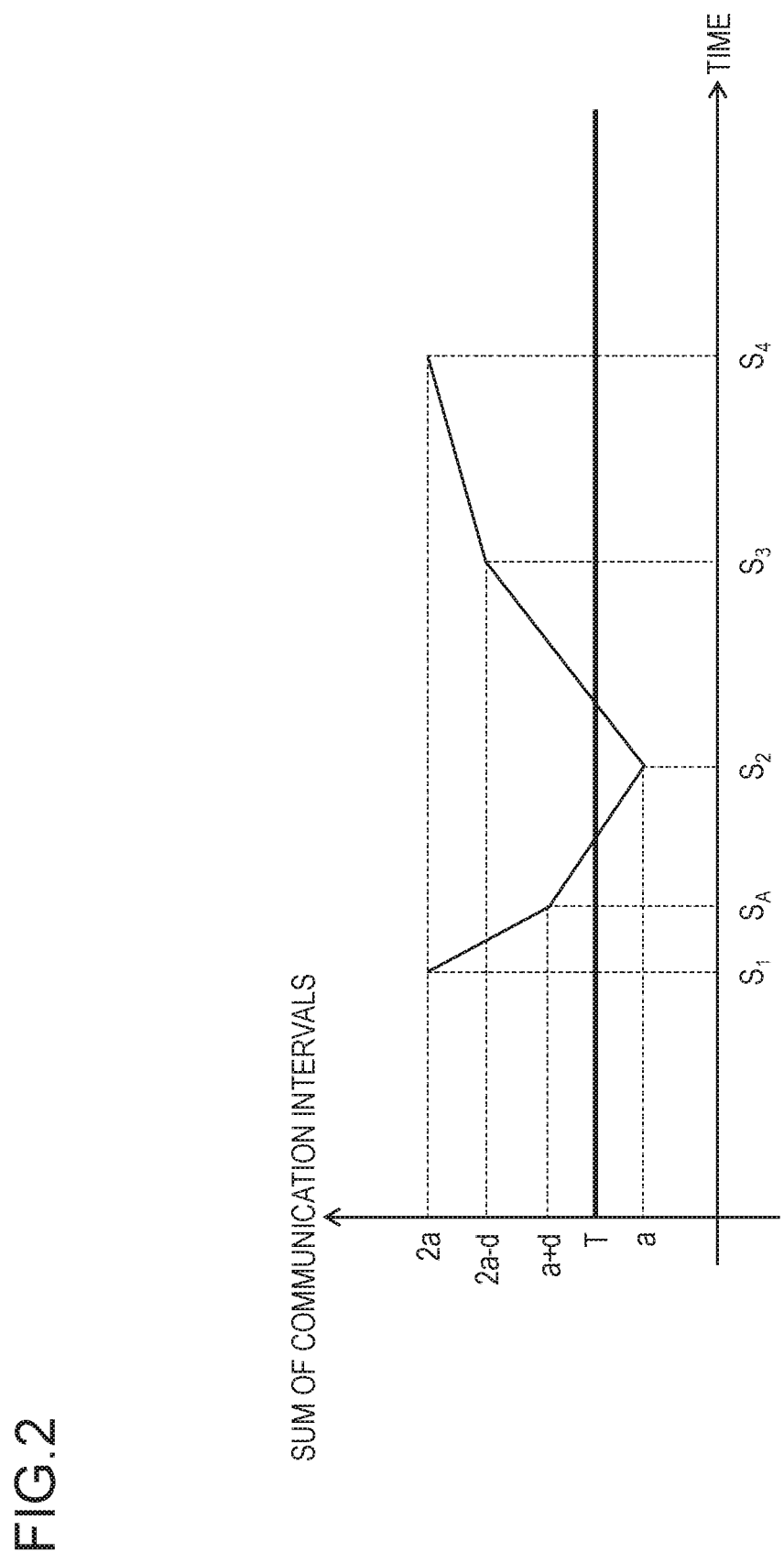
FIG. 2 is a diagram showing changes in the sum of communication intervals with respect to an arbitrary time.

Therefore, since the sum of communication intervals when an attack communication is not included is a value in the region of $2a$ and the sum of communication intervals in a normal communication-attack communication-normal communication pattern or a normal communication-attack communication-attack communication pattern is a value in the region of a or a value less than that value, there is a large difference between these values (see FIG. 2), which makes more accurate detection possible. The wording "in the region of" is used because there is a need to allow for a deviation tolerance, which will be described later.

<Learning>

Next, learning will be described. The design values about a communication interval and the sum of communication intervals and a deviation tolerance are estimated by learning (parametric estimation) by which the assumed distribution of values of a communication interval and the sum of communication intervals is set and parameters of the distribution are estimated using samples of the values of a communication interval and the sum of communication intervals which are obtained by observing a normal communication. The following description is given by taking, as an example, a case where the normal distribution is used as the assumed distribution. The normal distribution can be estimated by calculating two parameters: the arithmetic mean and standard deviation of samples. The arithmetic mean can be used as the estimated value of the design value. A deviation tolerance can be adjusted and determined based on the estimated distribution of a communication interval and the sum of communication intervals and the details thereof will be described later. The assumed distribution is not limited to the normal distribution, and an appropriate distribution such as the triangular distribution, the continuous uniform distribution, or the gamma distribution may be used as the assumed distribution.

<Threshold>

Finally, an appropriate adjustment of a deviation will be described. In light of what has been described above, it seems that it is possible to detect that an attack communication is included if the sum of communication intervals is less than $2a$. However, given a deviation tolerance, it is better to judge a communication to be abnormal if the sum of communication intervals is less than or equal to an appropriate threshold T (for example, a threshold T in FIG. 2), which is less than $2a$ to prevent false detection and is more than $a$ to improve the detection rate. In this case, the above statement can also be restated as follows: the threshold T: =the design value of the sum of communication intervals—a deviation tolerance for the sum of communication intervals.

<Estimated Distribution>

As described earlier, in abnormality detection using the sum of communication intervals, when an attack communication is included and a pattern in this case is a normal communication-an attack communication-a normal communication, the value of the sum of communication intervals is the same as the value of a communication interval observed when a normal communication is performed (between times $S_1$ and $S_2$ in FIG. 1). Thus, the estimated distribution of a communication interval in a normal communication can be used in place of the estimated distribution of the sum of communication intervals in the case of a normal communication-an attack communication-a normal communication. That is, by just learning a normal communication, it is possible to obtain both the estimated distribution of a communication interval observed when a normal communication is performed and the estimated distribution of the sum of communication intervals observed when an attack communication is performed in a normal communication-attack communication-normal communication pattern.

In this case, by using an appropriate probability density function (the integral result in the entire interval is 1) as the estimated distribution and setting the maximum permissible false detection rate (the false detection rate: =the number of normal communications erroneously detected as being abnormal ÷ the total number of normal communications) as $p_-$, it is possible to determine the maximum threshold T that satisfies the following formula from the estimated distribution observed when a normal communication is performed. Here, $L_-$ is the estimated distribution of the sum of communication intervals observed when a normal communication is performed.

$$\int^T L_-(x)dx \leq p_-$$

Moreover, once the threshold T is determined, it is possible to predict the detection rate (the detection rate: =the number of attack communications correctly detected as being abnormal ÷ the total number of attack communications) by the following formula from the estimated distribution observed when an attack communication is performed. Here, $L_+$ is the estimated distribution of the sum of communication intervals observed when an attack communication is performed (which is replaced by the estimated distribution of a communication interval observed when a normal communication is performed).

Predicted detection rate = $\int^T L_+(x)dx$

The integral can be obtained using numerical calculation or the like. On the other hand, for example, when the normal distribution is used as the estimated distribution, the threshold T may be determined as follows using the mean value $\mu$ a of the sum of communication intervals, the standard deviation $\sigma$, and a z value.

$$T = \mu - z \times \sigma$$

In the normal distribution, the relationship between the integral (probability) and z values is summarized in the standard normal distribution table, and it is only necessary to use a z value close to the probability of $1-p_- \times 2$ by referring to the table. If the maximum false detection rate is assumed to be 0.15%, the probability in the standard normal distribution table is 100%-0.15%×2=99.7%; therefore, it is possible to determine that a z value corresponding to the probability is 3 by referring to the table. The z values are values which are determined based only on the designated maximum false detection rate and do not have to be adjusted individually for each ID. It is possible to use a method by which the threshold T can be easily calculated in this way in accordance with a distribution which is used.

This makes it possible to mechanically make an adjustment to a deviation, which satisfies the maximum permissible false detection rate and makes the detection rate in that case predictable, and there is no need to make a manual adjustment for each ID. On the other hand, if there are individual requirements such as a case where particularly low false detection rates are required for specific IDs, separate setting such as designating the maximum false detection rate for each of the particular IDs may be made.

Moreover, the threshold T and the predicted false detection rate may be obtained as follows by designating the minimum permissible detection rate $p_+$; in this case, an adjustment can be made mechanically in a similar manner.

$$\int^T L_+(x)dx \leq p_+$$

Predicted false detection rate = $\int^T L_-(x)dx$

One of the advantages of using the sum of communication intervals in abnormality detection is that a deviation of the sum of communication intervals is relatively smaller than a deviation of a communication interval. Many ECUs decide on the timing of periodic sending by using an internal clock. For this reason, a communication which is transmitted immediately after a communication delayed by a wait for a collision seems to be transmitted earlier than usual after a shorter interval corresponding to that delay (because it is transmitted with the clock timing, not after an interval of the design value). On the other hand, the sum of communication intervals cancels out the delay and the time interval caused by earlier transmission. Thus, the value of a deviation of the sum of communication intervals is less than a value which is predicted from a deviation of a communication interval; the value of a deviation of the sum of communication intervals is sometimes less than even the value of a deviation of a communication interval. A small deviation is advantageous in that it helps improve the detection accuracy.

First Embodiment

Figure 3:
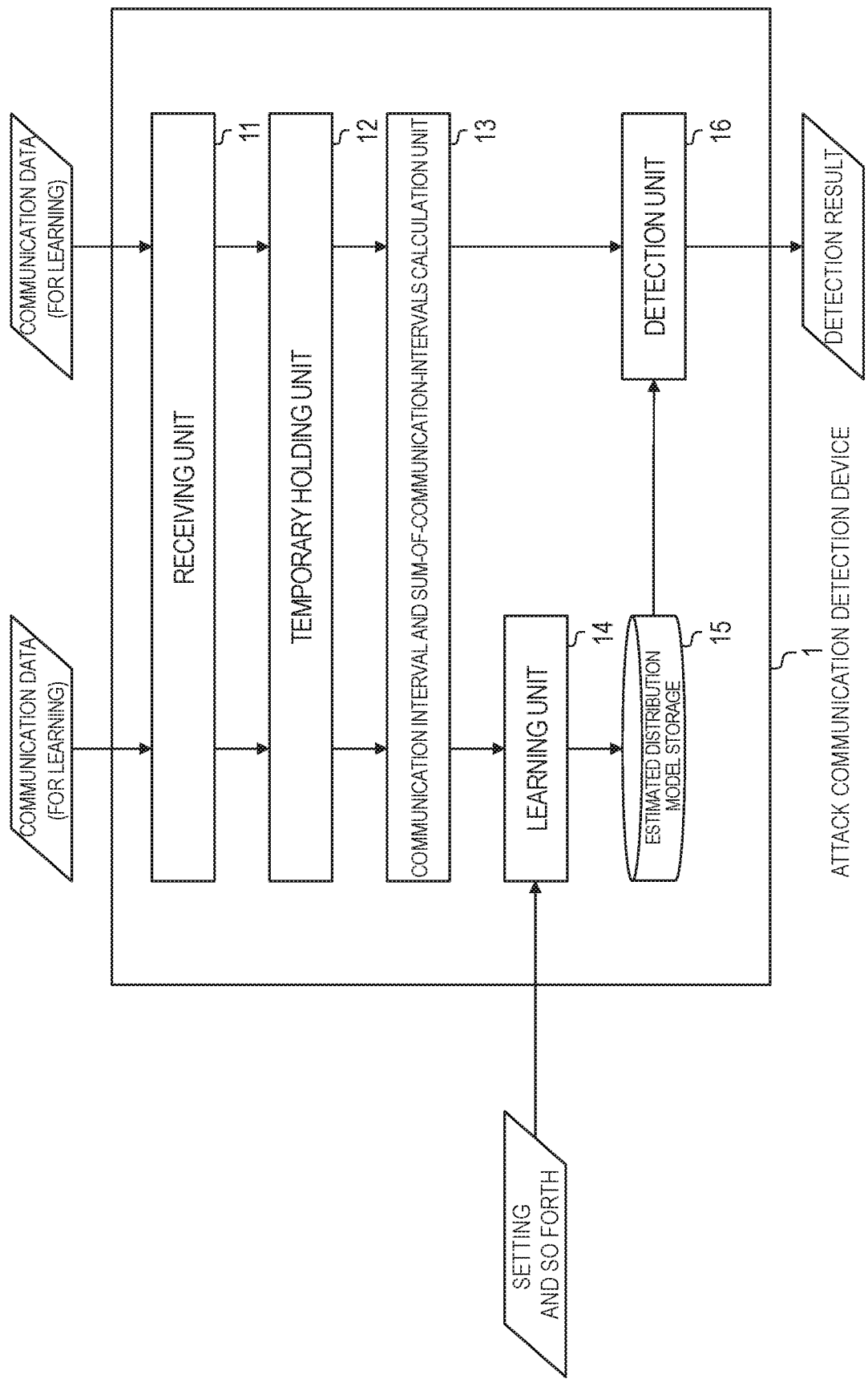
FIG. 3 is a block diagram showing the configuration of an attack communication detection device of a first embodiment.
Figure 4:
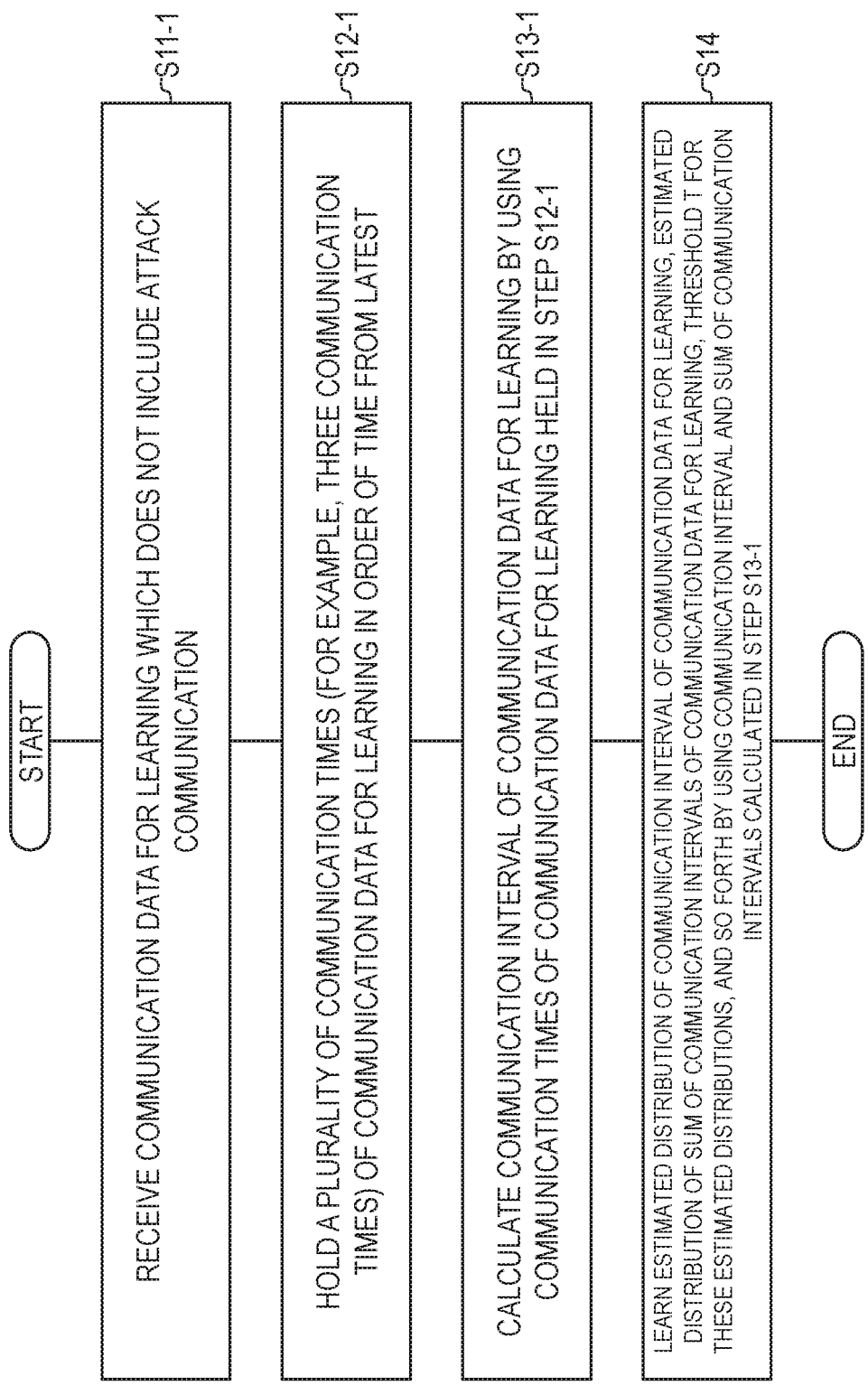
FIG. 4 is a flowchart showing a learning operation of the attack communication detection device of the first embodiment.

Hereinafter, the configuration of an attack communication detection device of a first embodiment will be described with reference to FIG. 3. As shown in FIG. 3, an attack communication detection device 1 of the present embodiment includes a receiving unit 11, a temporary holding unit 12, a communication interval and sum-of-communication-intervals calculation unit 13, a learning unit 14, an estimated distribution model storage 15, and a detection unit 16. Hereinafter, the operation of each component element at the time of learning will be described with reference to FIG. 4.

<Receiving Unit 11 (at the Time of Learning)>

The receiving unit 11 receives communication data for learning, which is a communication on a machine control information communication network or communication data generated by, for example, processing a communication and does not include an attack communication (S11-1). The receiving unit 11 assigns a communication time to each unit of data (for example, each packet or each frame) of the communication data for learning. It is assumed that the communication data for learning is distinguished from each other on a communication ID-by-communication ID basis and the following steps are executed on the communication data for learning with different IDs independently for each ID.

The receiving unit 11 may obtain a communication by intercepting a network or gateway or may separately obtain communication data as data such as a log from the other monitoring apparatus. The receiving unit 11 assigns the reception time (communication time) to a communication obtained by the interception; however, time assignment may be omitted when the communication data has been obtained as data such as a log and the reception time (communication time) has already been assigned thereto. The receiving unit 11 may select only a communication on which detection is to be performed by checking the ID of the communication and accept the selected communication.

<Temporary Holding Unit 12 (at the Time of Learning)>

The temporary holding unit 12 holds a plurality of communication times (for example, three communication times) of the communication data for learning in order of time from latest (S12-1).

<Communication Interval And Sum-of-Communication-Intervals Calculation Unit 13 (at the Time of Learning)>

The communication interval and sum-of-communication-intervals calculation unit 13 calculates a communication interval of the communication data for learning by using the communication times of the communication data for learning held in Step S12-1 (S13-1). Moreover, the communication interval and sum-of-communication-intervals calculation unit 13 also calculates the sum of communication intervals of the communication data for learning in order to calculate the above-described threshold T.

<Learning Unit 14>

The learning unit 14 learns the estimated distribution of the communication interval of the communication data for learning, the estimated distribution of the sum of communication intervals of the communication data for learning, the threshold T for these estimated distributions, and so forth by using the communication interval and the sum of communication intervals calculated in Step S13-1 with the assumed distribution and the maximum false detection rate (or the minimum detection rate) designated in the setting being used as conditions (S14). These estimated distributions, threshold T, and so forth are stored in the estimated distribution model storage 15 as an estimated distribution model.

For instance, the learning unit 14 determines estimated distributions and the threshold T for each ID using the communication interval and the sum of communication intervals calculated in Step S13-1 as sample data with the assumed distribution, the maximum false detection rate (or the minimum detection rate), and so forth designated in the setting (which is entered by an administrator of the device) being used as conditions, learns them as an estimated distribution model, and records the estimated distribution model on the estimated distribution model storage 15.

The learning unit 14 compiles a certain amount of sample data, executes preprocessing thereon, and then determines the estimated distributions. Examples of preprocessing of sample data include arranging the data depending on how large the value is and removing the top and bottom few percent of the data to curb the influence of an exception value. On the other hand, if possible, the learning unit 14 may perform learning by a method by which the learning unit 14 sequentially processes the sample data one by one without compiling the sample data and updates the estimated distribution model. For example, when the normal distribution is used, it is possible to perform sequential processing using a moment.

<Estimated Distribution Model Storage 15>

As described above, the estimated distribution model which is stored in the estimated distribution model storage 15 may include the estimated distribution of the communication interval of the communication data for learning, the estimated distribution of the sum of communication intervals of the communication data for learning, and the threshold T for these estimated distributions and may include parameters of the estimated distributions in addition to those described above. The estimated distribution model is stored in the estimated distribution model storage 15 for each TD. When the normal distribution is taken as an example, the estimated distribution model includes, for example, the mean value and standard deviation thereof and the threshold T therefor. Only a necessary model may be stored as appropriate in accordance with requirements. For example, only the threshold T which is used at the time of detection may be stored. Moreover, only the mean value and standard deviation are stored in the estimated distribution model storage 15 and the threshold T may be calculated by the detection unit 16 as occasion arises.

Figure 5:
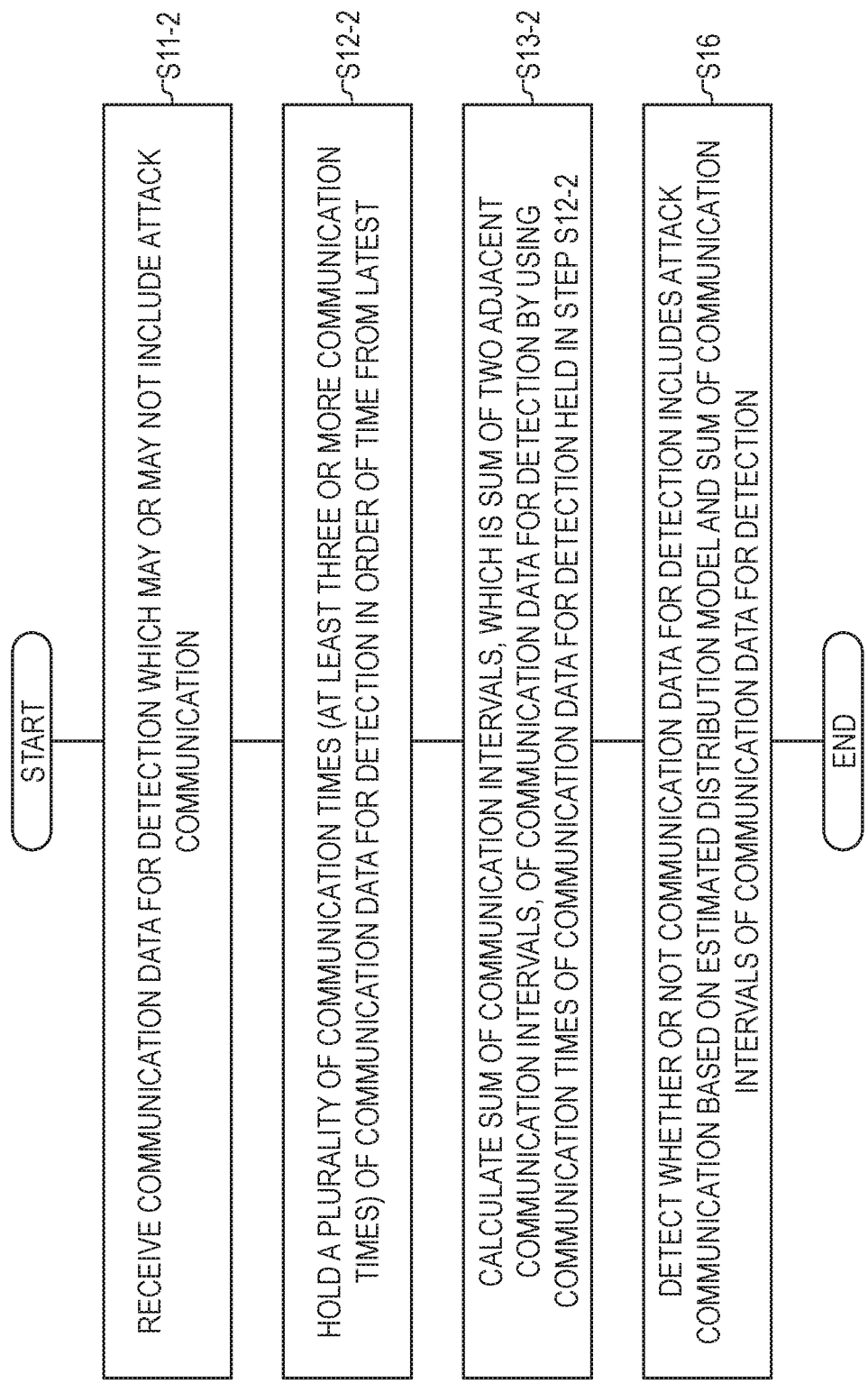
FIG. 5 is a flowchart showing a detection operation of the attack communication detection device of the first embodiment.

Hereinafter, the operation of each component element at the time of detection will be described with reference to FIG. 5.

<Receiving Unit 11 (at the Time of Detection)>

The receiving unit 11 receives communication data for detection, which is a communication on a machine control information communication network or communication data generated by, for example, processing a communication and may or may not include an attack communication (S11-2).

<Temporary Holding Unit 12 (at the Time of Detection)>

The temporary holding unit 12 holds a plurality of communication times (at least three or more communication times) of the communication data for detection in order of time from latest (S12-2). Since the latest three or more communication times of communications with the same ID are needed to calculate the sum of communication intervals, the temporary holding unit 12 holds the latest three or more communication times for each ID.

When a communication newly arrives, the temporary holding unit 12 checks the TD thereof, discards the earliest communication time of the corresponding ID, and adds a new communication time (a First in First out buffer).

<Communication Interval and Sum-of-Communication-Intervals Calculation Unit 13 (at the Time of Detection)>

The communication interval and sum-of-communication-intervals calculation unit 13 calculates the sum of communication intervals, which is the sum of two adjacent communication intervals, of the communication data for detection by using the communication times of the communication data for detection held in Step S12-2 (S13-2). Step S13-2 will be described using the example of FIG. 1. For example, in the example of FIG. 1, when a unit of communication (for instance, a packet or frame) of communication data at the time $S_1$ is received and a communication time $S_1$ is newly recorded, the sum of communication intervals $2a$ is calculated using the time $S_1$ and two communication times before the time $S_1$. Likewise, when a unit of communication (for instance, a packet or frame) of communication data at the time $S_A$ is received and a communication time $S_A$ is newly recorded, the sum of communication intervals a+d is calculated using the time $S_A$, the time $S_1$, and the time $S_0$. Likewise, when a unit of communication (for instance, a packet or frame) of communication data at the time $S_2$ is received and a communication time $S_2$ is newly recorded, the sum of communication intervals a is calculated using the time $S_2$, the time $S_A$, and the time $S_1$. Therefore, in the case of the example of FIG. 1, with the reception of the communication data, the sum of communication intervals is sequentially calculated in the order of $2a$, a+d, a, $2a$-d, and $2a$.

<Detection Unit 16>

The detection unit 16 detects whether or not the communication data for detection includes an attack communication based on the estimated distribution model and the sum of communication intervals of the communication data for detection (S16).

More specifically, the detection unit 16 compares the sum of communication intervals, which is sequentially calculated in Step S13-2, with the estimated distribution model stored in the estimated distribution model storage 15, and judges that the communication data for detection includes an attack communication if the sum of communication intervals of the communication data for detection at an arbitrary time is less than or equal to the threshold T for the estimated distributions and outputs the detection result (S16). As described earlier, the threshold T may be calculated in advance at the time of learning or may be calculated by the detection unit 16 as occasion arises. Detection processing may be performed every time a communication is received or may be performed on a certain number of communications.

The detection result indicating an abnormal communication or a normal communication may be output, or the detection result may be output only when an abnormal communication has been performed. Information by which the communication data for detection is identified, such as a reception time or an ID, may be assigned to the detection result. When abnormalities are consecutively detected in communications with the same TD, they may be collected and output or they may be collected and output with an abnormality detection start time, an end time, the ID, and so forth assigned thereto. The detection unit 16 may transmit the detection result through a network or may provide transmission and notification of the detection result via the other device.

When an attack communication is frequently inserted, the attack communication collides with a normal communication and one of the communications is sometimes not sent. In this case, the receiving unit 11 may receive an error frame which is transmitted in CAN, infer the communication which has not been sent based on the error frame, and treat the communication the same as a regular communication. When an attack communication collides with a normal communication and only the attack communication is sent, the communication interval and the sum of communication intervals in this case cannot be distinguished from those observed when the normal communication is performed. However, as described above, with an error frame taken into consideration, these communications can be treated as two communications: the normal communication and the attack communication that have been sent at the same time, which makes it possible to distinguish the communication interval and the sum of communication intervals observed when the attack communication is performed from those observed when the normal communication is performed.

The attack communication detection device 1 may be configured as a device that performs only learning, from which the detection unit 16 is removed, and a device that performs only detection, from which the learning unit 14 is removed. The device that performs only learning stores the estimated distribution model in the estimated distribution model storage 15 as the result of learning. By storing the stored estimated distribution model in the estimated distribution model storage 15 of the device that performs only detection, it is possible to perform detection in the device without learning. The device that performs only detection will be described later in a first modification.

Second Embodiment

Varieties of periodic sending exist. Communications are usually sent at fixed communication intervals; however, in some varieties of periodic sending, a certain event sometimes causes a communication to be sent at a short interval (or a long interval) out of a deviation tolerance only during that event and then communications are sent at the same fixed intervals as before. Abnormality detection which is performed in periodic sending with an offset deviation, which is one of the above varieties of periodic sending, will be described below.

Figure 6:
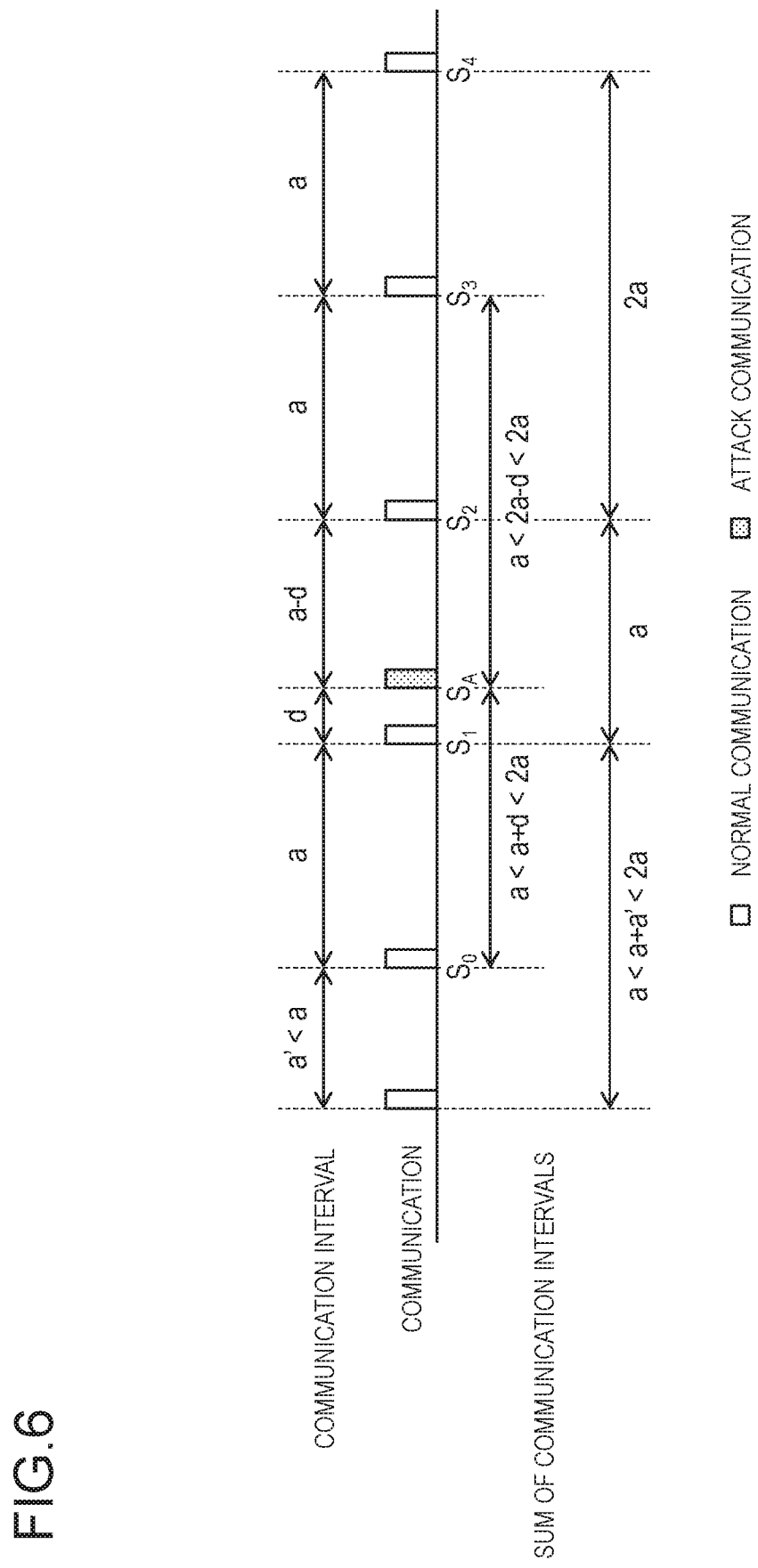
FIG. 6 is a diagram showing an example of a communication interval and the sum of communication intervals when there is an offset deviation.

A communication interval and the sum of communication intervals in periodic sending with an offset deviation are shown in FIG. 6. As shown in FIG. 6, since there is a portion in which the interval between normal communications is a short interval a' (< a), a' is erroneously detected as having been caused by an attack communication in an algorithm that detects a communication interval shorter than the design value a as having been caused by an attack communication. On the other hand, the sum of communication intervals observed when a normal communication is performed is distributed in the range from a+a' to $2a$ and the sum of communication intervals observed when an abnormal communication is performed is in the neighborhood of a in a normal-attack-normal pattern; therefore, by setting the threshold T at a value in the region of a, it is possible to detect that, if the sum of communication intervals is equal to the threshold T or less than the threshold T, the communication is abnormal. The threshold T is set at an appropriate value in the range from a to a+a', allowing for a deviation tolerance, and, once the threshold is determined, it is possible to perform detection using the sum of communication intervals in the same manner as that described in the first embodiment.

Figure 7:
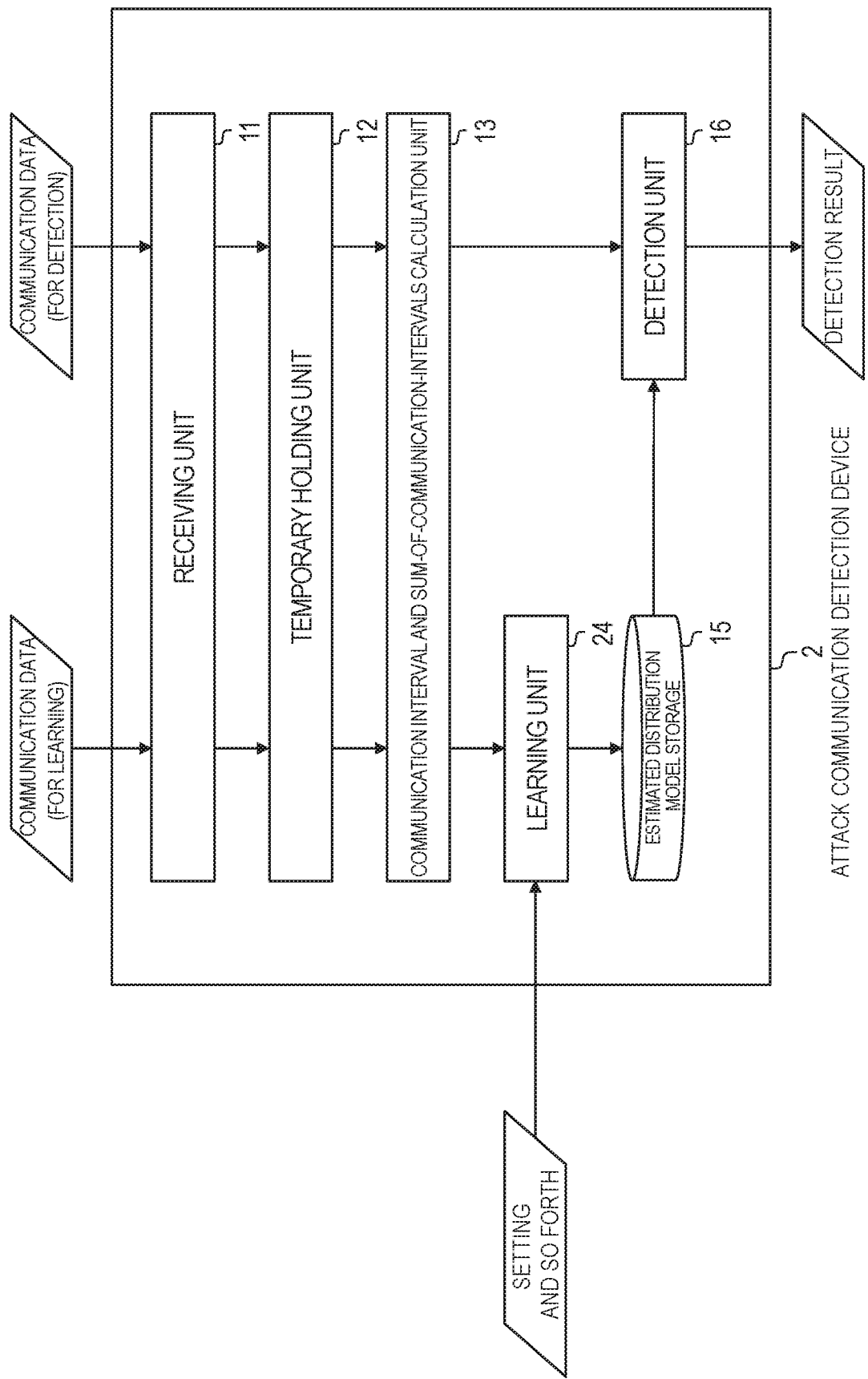
FIG. 7 is a block diagram showing the configuration of an attack communication detection device of a second embodiment.

The configuration of an attack communication detection device of a second embodiment will be described with reference to FIG. 7. As shown in FIG. 7, an attack communication detection device 2 of the present embodiment includes a receiving unit 11, a temporary holding unit 12, a communication interval and sum-of-communication-intervals calculation unit 13, a learning unit 24, an estimated distribution model storage 15, and a detection unit 16, and the component elements other than the learning unit 24 are the same as those of the first embodiment.

<Learning Unit 24>

Figure 8:
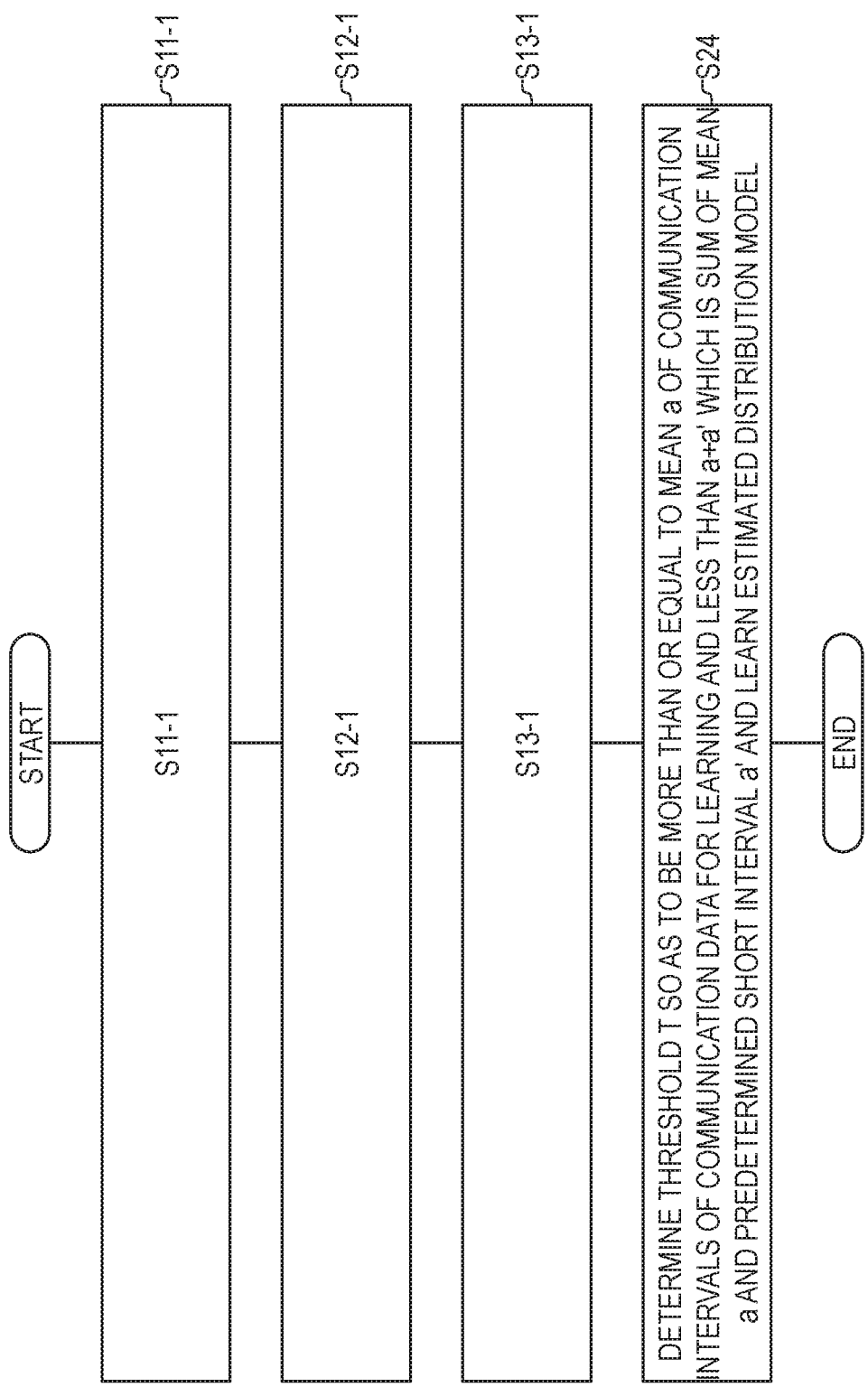
FIG. 8 is a flowchart showing a learning operation of the attack communication detection device of the second embodiment.

The operation of the learning unit 24 will be described with reference to FIG. 8. As described above, the learning unit 24 determines the threshold T so as to be more than or equal to the mean a of the communication intervals of the communication data for learning and less than a+a' which is the sum of the mean a and a predetermined short interval a' and learns an estimated distribution model (S24).

The learning unit 24 obtains an estimated distribution as follows. First, the learning unit 24 obtains the estimated distribution of the communication interval from which the short interval a' is excluded and the estimated distribution of the sum of communication intervals, from which the sum of short intervals a+a' is excluded, based on the communication times of the communication data for learning. As a method of exclusion, there is a technique of obtaining an estimated distribution by arranging the data depending on how large the value is and removing the top and bottom few percent of the data or a method of performing distribution estimation using likelihood.

Next, the learning unit 24 obtains the estimated distribution of only the short interval a' and the estimated distribution of only the sum of short intervals a+a'. As the estimated distribution of the short interval, a distribution which is different from the above-described estimated distribution from which the short interval is excluded may be used. The learning unit 24 can use, for example, the normal distribution for the former and the continuous uniform distribution for the latter. Once the estimated distribution is obtained in this way, the threshold can be obtained in the same manner as that described in the first embodiment.

Third Embodiment

In some ECUs, the sending timing varies depending on a difference in machine conditions, for example, conditions such as stopping, traveling, and automatic traveling of a vehicle. In such a case, in periodic sending, a communication interval and the sum of communication intervals are changed depending on the machine conditions. Hereinafter, an attack communication detection device 3 of a third embodiment that performs abnormality detection in accordance with the machine conditions will be described.

Figure 9:
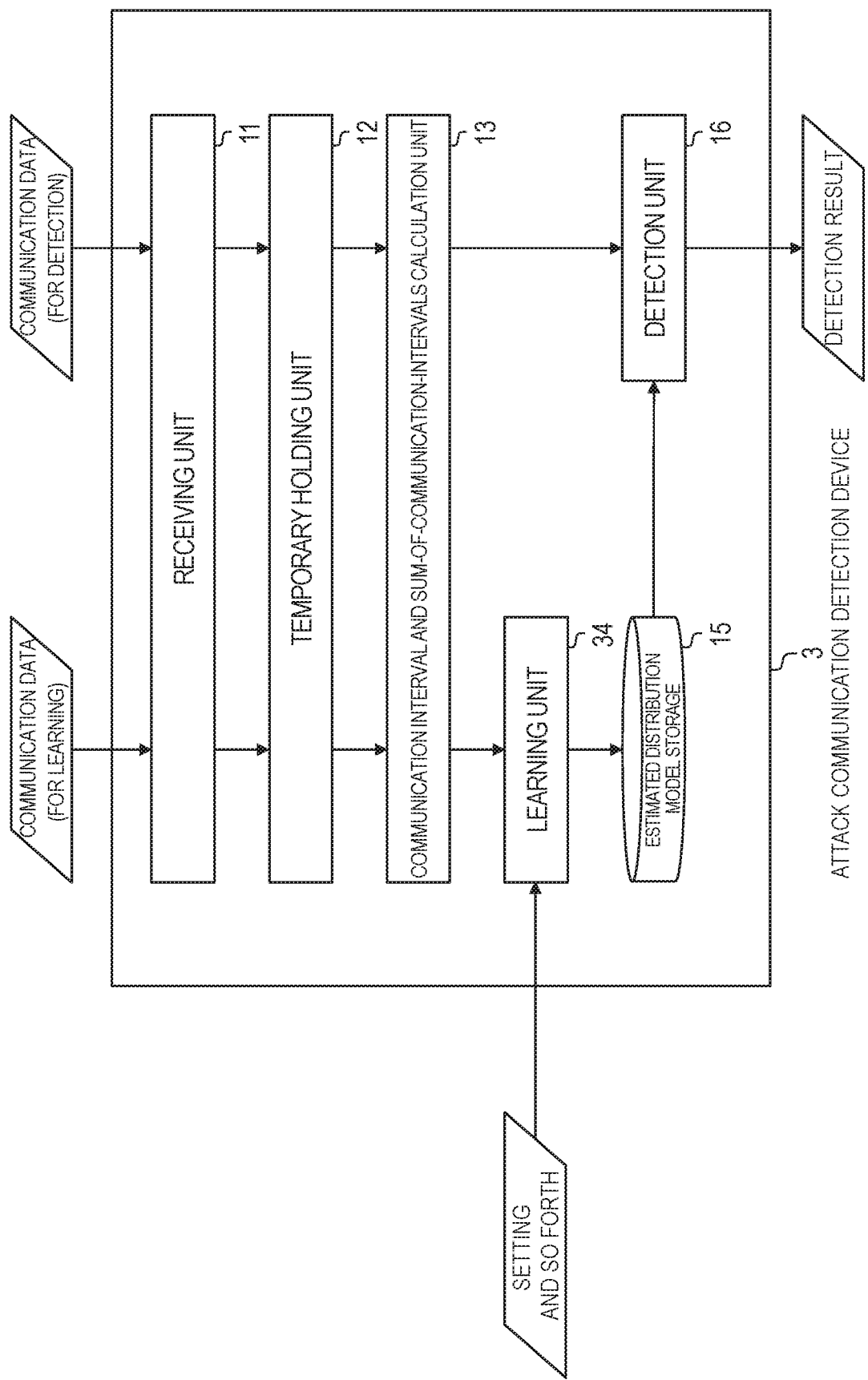
FIG. 9 is a block diagram showing the configuration of an attack communication detection device of a third embodiment.

As shown in FIG. 9, the attack communication detection device 3 of the present embodiment includes a receiving unit 11, a temporary holding unit 12, a communication interval and sum-of-communication-intervals calculation unit 13, a learning unit 34, an estimated distribution model storage 15, and a detection unit 16, and the component elements other than the learning unit 34 are the same as those of the first embodiment.

<Learning Unit 34>

The operation of the learning unit 34 will be described with reference to FIG. 10. The learning unit 34 learns an estimated distribution model for each machine condition of an electronic control unit (S34). More specifically, the learning unit 34 sets an estimated distribution model for each machine condition and stores the estimated distribution model in the estimated distribution model storage 15 for each machine condition and each ID. The receiving unit 11 receives a communication or signal indicating a machine condition, judges the machine condition in accordance with the received contents, and switches the estimated distribution model storage 15 so as to be ready for that machine condition. This makes it possible to perform abnormality detection even when the sending timing varies depending on a machine condition. The communication or signal indicating a machine condition may be transmitted over a network or may be transmitted over a different path.

First Modification

An attack communication detection device 1A of a first modification will be described with reference to FIG. 11. The attack communication detection device 1A of the present modification is an example obtained by removing the learning function from the device of the first embodiment and configuring the device so as to perform only detection. As shown in FIG. 11, the attack communication detection device 1A of the present modification includes a receiving unit 11, a temporary holding unit 12, a sum-of-communication-intervals calculation unit 13A, an estimated distribution model storage 15, and a detection unit 16. In the estimated distribution model storage 15, the estimated distribution model learned in Step S14 or the like of the first embodiment is stored in advance. In the present modification, although calculation of the sum of communication intervals of communication data for detection is required, calculation of a communication interval of the communication data for detection is not necessarily required; thus, the name of the communication interval and sum-of-communication-intervals calculation unit 13 of the first embodiment is changed to the sum-of-communication-intervals calculation unit 13A in the present modification.

<Effects>

According to the attack communication detection devices of the above-described embodiments and modification, a design value and a deviation can be grasped by learning even when a design value and a deviation are unknown, which makes it possible to adapt abnormality detection to various vehicle types and machines with ease. Moreover, it is possible to make an automatic adjustment to the desired accuracy of the maximum permissible false detection rate or the like with ease by designating it without making a manual adjustment for each ID and thereby achieve an increase in efficiency. The use of the sum of communication intervals improves the detection accuracy.

<Appendix>

Each device according to the present invention has, as a single hardware entity, for example, an input unit to which a keyboard or the like is connectable, an output unit to which a liquid crystal display or the like is connectable, a communication unit to which a communication device (for example, communication cable) capable of communication with the outside of the hardware entity is connectable, a central processing unit (CPU, which may include cache memory and/or registers), RAM or ROM as memories, an external storage device which is a hard disk, and a bus that connects the input unit, the output unit, the communication unit, the CPU, the RAM, the ROM, and the external storage device so that data can be exchanged between them. The hardware entity may also include, for example, a device (drive) capable of reading and writing a recording medium such as a CD-ROM as desired. A physical entity having such hardware resources may be a general-purpose computer or an embedded device, for example.

The external storage device of the hardware entity has stored therein programs necessary for embodying the aforementioned functions and data necessary in the processing of the programs (in addition to the external storage device, the programs may be prestored in ROM as a storage device exclusively for reading out, for example). Also, data or the like resulting from the processing of these programs are stored in the RANI and the external storage device as appropriate.

In the hardware entity, the programs and data necessary for processing of the programs stored in the external storage device (or ROM and the like) are read into memory as necessary to be interpreted and executed/processed as appropriate by the CPU. As a consequence, the CPU embodies predetermined functions (the component elements represented above as units, means, or the like).

The present invention is not limited to the above embodiments, but modifications may be made within the scope of the present invention. Also, the processes described in the embodiments may be executed not only in a chronological sequence in accordance with the order of their description but may be executed in parallel or separately according to the processing capability of the device executing the processing or any necessity.

As already mentioned, when the processing functions of the hardware entities described in the embodiments (the devices of the present invention) are to be embodied with a computer or an embedded device, the processing details of the functions to be provided by the hardware entities are described by a program. By the program then being executed on the computer or the embedded device, the processing functions of the hardware entity are embodied on the computer or the embedded device.

The program describing the processing details can be recorded on a recording medium which can be read by a computer or an embedded device. The recording medium which can be read by the computer or the embedded device may be any kind, such as a magnetic recording device, an optical disk, a magneto-optical recording medium, or a semiconductor memory. More specifically, a magnetic recording device may be a hard disk device, flexible disk, or magnetic tape; an optical disk may be a DVD (digital versatile disc), a DVD-RAM (random access memory), a CD-ROM (compact disc read only memory), or a CD-R (recordable)/RW (rewritable); a magneto-optical recording medium may be an MO (magneto-optical disc); and a semiconductor memory may be EEP-ROM (electronically erasable and programmable-read only memory), for example.

Also, the distribution of this program is performed by, for example, selling, transferring, or lending a portable recording medium such as a DVD or a CD-ROM on which the program is recorded. Furthermore, a configuration may be adopted in which this program is distributed by storing the program in a storage device of a server computer and transferring the program to other computers or embedded devices from the server computer via a network.

The computer or the embedded device that executes such a program first, for example, temporarily stores the program recorded on the portable recording medium or the program transferred from the server computer in a storage device thereof. At the time of execution of processing, the computer or the embedded device then reads the program stored in the storage device thereof and executes the processing in accordance with the read program. Also, as another form of execution of this program, the computer or the embedded device may read the program directly from the portable recording medium and execute the processing in accordance with the program and, furthermore, every time the program is transferred to the computer or the embedded device from the server computer, the computer or the embedded device may sequentially execute the processing in accordance with the received program Also, a configuration may be adopted in which the transfer of a program to the computer or the embedded device from the server computer is not performed and the above-described processing is executed by so-called application service provider (ASP)-type service by which the processing functions are embodied only by an instruction for execution thereof and result acquisition. Note that a program in this form shall encompass information that is used in processing by an electronic computer and acts like a program (such as data that is not a direct command to a computer or an embedded device but has properties prescribing processing of the computer or embedded device).

Further, although the hardware entity was described as being configured via execution of a predetermined program on a computer or an embedded device in this form, at least some of these processing details may instead be embodied with hardware.

What is claimed is:

1. An attack communication detection device that detects an attack communication from a communication of each electronic control unit in a communication network, the attack communication detection device comprising:
   circuitry configured to
   receive communication data for detection which may or may not include the attack communication;
   calculate a sum of communication intervals, which is a sum of two adjacent communication intervals, of the communication data for detection;
   store, in an estimated distribution model storage, in advance an estimated distribution model of the communication interval and the sum of communication intervals of communication data for learning which does not include the attack communication; and
   detect whether or not the communication data for detection includes the attack communication based on the estimated distribution model and the sum of communication intervals of the communication data for detection,
   wherein
   the estimated distribution model includes an estimated distribution of the communication interval of the communication data for learning, an estimated distribution of the sum of communication intervals of the communication data for learning, and a threshold for these estimated distributions.

2. The attack communication detection device according to claim 1, wherein
   the circuitry judges that the communication data for detection includes the attack communication if the sum of communication intervals of the communication data for detection at an arbitrary time is less than or equal to the threshold.

3. The attack communication detection device according to claim 2, wherein
   the circuitry determines the threshold so as to be more than or equal to a mean a of the communication intervals of the communication data for learning and less than a+a' which is a sum of the mean a and a predetermined short interval a'.

4. The attack communication detection device according to claim 3, wherein
   the circuitry learns the estimated distribution model for each machine condition of the electronic control unit.

5. A non-transitory computer readable storage medium containing program instructions that when executed make a computer function as the attack communication detection device according to claim 4.

6. A non-transitory computer readable storage medium containing program instructions that when executed make a computer function as the attack communication detection device according to claim 3.

7. The attack communication detection device according to claim 2, wherein
   the circuitry learns the estimated distribution model for each machine condition of the electronic control unit.

8. A non-transitory computer readable storage medium containing program instructions that when executed make a computer function as the attack communication detection device according to claim 7.

9. A non-transitory computer readable storage medium containing program instructions that when executed make a computer function as the attack communication detection device according to claim 2.

10. The attack communication detection device according to claim 1, wherein
the circuitry determines the threshold so as to be more than or equal to a mean a of the communication intervals of the communication data for learning and less than a+a' which is a sum of the mean a and a predetermined short interval a'.

11. The attack communication detection device according to claim 10, wherein
the circuitry learns the estimated distribution model for each machine condition of the electronic control unit.

12. A non-transitory computer readable storage medium containing program instructions that when executed make a computer function as the attack communication detection device according to claim 11.

13. A non-transitory computer readable storage medium containing program instructions that when executed make a computer function as the attack communication detection device according to claim 10.

14. A non-transitory computer readable storage medium containing program instructions that when executed make a computer function as the communication detection device according to claim 1.

15. The attack communication detection device according to claim 1, wherein
the circuitry learns the estimated distribution model for each machine condition of the electronic control unit.

16. A non-transitory computer readable storage medium containing program instructions that when executed make a computer function as the attack communication detection device according to claim 15.

17. A non-transitory computer readable storage medium containing program instructions that when executed make a computer function as the attack communication detection device according to claim 1.

18. An attack communication detection device that detects an attack communication from a communication of each electronic control unit in a communication network, the attack communication detection device comprising:
circuitry configured to
receive communication data for learning which does not include the attack communication and communication data for detection which may or may not include the attack communication;
calculate a communication interval of the communication data for learning and a sum of communication intervals, which is a sum of two adjacent communication intervals, of the communication data for detection;
learn an estimated distribution model of the communication interval and the sum of communication intervals of the communication data for learning; and
detect whether or not the communication data for detection includes the attack communication based on the estimated distribution model and the sum of communication intervals of the communication data for detection,
wherein
the estimated distribution model includes an estimated distribution of the communication interval of the communication data for learning, an estimated distribution of the sum of communication intervals of the communication data for learning, and a threshold for these estimated distributions.

19. The attack communication detection device according to claim 18, wherein
the circuitry judges that the communication data for detection includes the attack communication if the sum of communication intervals of the communication data for detection at an arbitrary time is less than or equal to the threshold.

20. The attack communication detection device according to Claim 19, wherein
the circuitry determines the threshold so as to be more than or equal to a mean a of the communication intervals of the communication data for learning and less than a+a' which is a sum of the mean a and a predetermined short interval a'.

21. The attack communication detection device according to claim 20, wherein
the circuitry learns the estimated distribution model for each machine condition of the electronic control unit.

22. A non-transitory computer readable storage medium containing program instructions that when executed make a computer function as the attack communication detection device according to claim 21.

23. A non-transitory computer readable storage medium containing program instructions that when executed make a computer function as the attack communication detection device according to claim 20.

24. The attack communication detection device according to claim 19, wherein
the circuitry learns the estimated distribution model for each machine condition of the electronic control unit.

25. A non-transitory computer readable storage medium containing program instructions that when executed make a computer function as the attack communication detection device according to claim 24.

26. A non-transitory computer readable storage medium containing program instructions that when executed make a computer function as the attack communication detection device according to claim 19.

27. The attack communication detection device according to claim 18, wherein
the circuitry determines the threshold so as to be more than or equal to a mean a of the communication intervals of the communication data for learning and less than a+a' which is a sum of the mean a and a predetermined short interval a'.

28. The attack communication detection device according to claim 27, wherein
the circuitry learns the estimated distribution model for each machine condition of the electronic control unit.

29. A non-transitory computer readable storage medium containing program instructions that when executed make a computer function as the attack communication detection device according to claim 28.

30. A non-transitory computer readable storage medium containing program instructions that when executed make a computer function as the attack communication detection device according to claim 27.

31. The attack communication detection device according to claim 18, wherein
the circuitry learns the estimated distribution model for each machine condition of the electronic control unit.

32. A non-transitory computer readable storage medium containing program instructions that when executed make a computer function as the attack communication detection device according to claim 31.

33. A non-transitory computer readable storage medium containing program instructions that when executed make a computer function as the attack communication detection device according to claim 18.

34. A non-transitory computer readable storage medium containing program instructions that when executed make a computer function as the attack communication detection device according to claim 18.

35. An attack communication detection device that detects an attack communication from a communication of each electronic control unit in a communication network, the attack communication detection device comprising:
   circuitry configured to
      receive communication data for detection which may or may not include the attack communication;
      calculate a sum of communication intervals, which is a sum of two adjacent communication intervals, of the communication data for detection;
      store, in an estimated distribution model storage, in advance an estimated distribution model of the communication interval and the sum of communication intervals of communication data for learning which does not include the attack communication; and
      detect whether or not the communication data for detection includes the attack communication based on the estimated distribution model and the sum of communication intervals of the communication data for detection,
   wherein
   the circuitry learns the estimated distribution model for each machine condition of the electronic control unit, the machine condition being information about a state of the machine, the machine condition being one of a plurality of predetermined machine conditions that include at least (i) a state that the machine is stopped and (ii) a state that the machine is traveling.

36. A non-transitory computer readable storage medium containing program instructions that when executed make a computer function as the attack communication detection device according to claim 35.

37. An attack communication detection method of detecting an attack communication from a communication of each electronic control unit in a communication network, the attack communication detection method comprising:
   a step of receiving communication data for detection which may or may not include the attack communication;
   a step of calculating a sum of communication intervals, which is a sum of two adjacent communication intervals, of the communication data for detection; and
   a step of detecting whether or not the communication data for detection includes the attack communication based on an estimated distribution model of the communication interval and the sum of communication intervals of communication data for learning which does not include the attack communication and the sum of communication intervals of the communication data for detection,
   wherein
   the estimated distribution model includes an estimated distribution of the communication interval of the communication data for learning, an estimated distribution of the sum of communication intervals of the communication data for learning, and a threshold for these estimated distributions.

38. An attack communication detection device that detects an attack communication from a communication of each electronic control unit in a communication network, the attack communication detection device comprising:
   circuitry configured to
   receive communication data for learning which does not include the attack communication and communication data for detection which may or may not include the attack communication:
   calculate a communication interval of the communication data for learning and a sum of communication intervals, which is a sum of two adjacent communication intervals, of the communication data for detection;
   learn an estimated distribution model of the communication interval and the sum of communication intervals of the communication data for learning; and
   detect whether or not the communication data for detection includes the attack communication based on the estimated distribution model and the sum of communication intervals of the communication data for detection, wherein
   the circuitry learns the estimated distribution model for each machine condition of the electronic control unit, the machine condition being information about a state of the machine, the machine condition being one of a plurality of predetermined machine conditions that include at least (i) a state that the machine is stopped and (ii) a state that the machine is in traveling.

39. A non-transitory computer readable storage medium containing program instructions that when executed make a computer function as the attack communication detection device according to claim 38.

* * * * *

UNITED STATES PATENT AND TRADEMARK OFFICE
CERTIFICATE OF CORRECTION

| | |
|---|---|
| PATENT NO. | : 11,588,827 B2 |
| APPLICATION NO. | : 16/755205 |
| DATED | : February 21, 2023 |
| INVENTOR(S) | : Yasushi Okano et al. |

It is certified that error appears in the above-identified patent and that said Letters Patent is hereby corrected as shown below:

In the Claims

In Claim 14, Column 15, Line 30, please change "the communication" to --the attack communication--.

Signed and Sealed this
Twelfth Day of September, 2023

Katherine Kelly Vidal
*Director of the United States Patent and Trademark Office*